US011343353B2

(12) United States Patent
He et al.

(10) Patent No.: US 11,343,353 B2
(45) Date of Patent: *May 24, 2022

(54) METHOD AND SYSTEM OF DISPATCHING REQUESTS IN A CONTENT DELIVERY NETWORK

(71) Applicant: Alibaba Group Holding Limited, Grand Cayman (KY)

(72) Inventors: Yanfeng He, Hangzhou (CN); Xiaoliang Zhang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,294

(22) Filed: Jun. 29, 2018

(65) Prior Publication Data

US 2018/0309845 A1    Oct. 25, 2018

Related U.S. Application Data

(63) Continuation of application No. 14/463,307, filed on Aug. 19, 2014, now Pat. No. 10,165,080.

(30) Foreign Application Priority Data

Aug. 20, 2013   (CN) .......................... 201310363395.7

(51) Int. Cl.
  *G06F 15/16*  (2006.01)
  *H04L 67/60*  (2022.01)
  (Continued)

(52) U.S. Cl.
  CPC .......... *H04L 67/32* (2013.01); *H04L 61/1511* (2013.01); *H04L 67/1021* (2013.01); *H04L 67/327* (2013.01); *H04L 67/42* (2013.01)

(58) Field of Classification Search
  CPC . H04L 67/32; H04L 61/1511; H04L 67/1021; H04L 67/327; H04L 67/42
  (Continued)

(56) References Cited

U.S. PATENT DOCUMENTS

| 6,108,703 A | 8/2000 | Leighton et al. |
| 7,925,782 B2 | 4/2011 | Sivasubramanian et al. |

(Continued)

FOREIGN PATENT DOCUMENTS

| CN | 101202384 | 6/2008 |
| CN | 101202684 | 6/2008 |

(Continued)

OTHER PUBLICATIONS

The European Office Action dated Mar. 9, 2018 for European Patent Application No. 14762130.4, a counterpart foreign application of U.S. Appl. No. 14/463,307, 6 pages.

(Continued)

*Primary Examiner* — Cheikh T Ndiaye
*Assistant Examiner* — Ayele F Woldemariam
(74) *Attorney, Agent, or Firm* — Lee & Hayes, P.C.

(57) ABSTRACT

The present disclosure disclosed a method and a system for precisely dispatching a request in a content delivery network (CDN), which comprises: a domain name system (DNS) authorized by a CDN of a target website receiving, from a local DNS of a terminal in which a client is located, an IP address of the local DNS and a domain name of the target website of service content requested by the client; finding, in a shared dispatching database, an address of an optimal CDN node server of the target website that is suitable for providing service to the client based on the IP address of the local DNS and the domain name of the target website, returning the found address to the client. The disclosed method and system are able to solve the issue of low (Continued)

processing efficiency in CDN caused by an increase in resolution time needed in a process of IP dispatching and the issue of address error during the dispatching.

18 Claims, 9 Drawing Sheets

(51) Int. Cl.
*H04L 61/4511* (2022.01)
*H04L 67/1021* (2022.01)
*H04L 67/63* (2022.01)
*H04L 67/01* (2022.01)

(58) Field of Classification Search
USPC ........................................................ 709/203
See application file for complete search history.

(56) References Cited

U.S. PATENT DOCUMENTS

| | | | |
|---|---|---|---|
| 8,527,635 B2 | 9/2013 | Jeon et al. | |
| 2008/0071925 A1 | 3/2008 | Leighton et al. | |
| 2008/0086574 A1* | 4/2008 | Raciborski | H04L 29/12066 709/245 |
| 2008/0140847 A1* | 6/2008 | Almog | H04L 29/12066 709/228 |
| 2010/0042724 A1* | 2/2010 | Jeon | H04L 67/1008 709/226 |
| 2010/0125626 A1* | 5/2010 | Lucas | H04L 67/1008 709/203 |
| 2010/0161799 A1* | 6/2010 | Maloo | H04L 61/1511 709/226 |
| 2011/0153864 A1* | 6/2011 | Prasad | H04L 29/12066 709/242 |
| 2012/0117267 A1 | 5/2012 | Holloway et al. | |
| 2012/0131096 A1 | 5/2012 | Bugenhagen | |
| 2012/0198020 A1 | 8/2012 | Parker et al. | |
| 2012/0203861 A1 | 8/2012 | Flack et al. | |
| 2013/0103785 A1 | 4/2013 | Lyon | |
| 2013/0144994 A1 | 6/2013 | Li et al. | |
| 2013/0279414 A1* | 10/2013 | Damola | H04L 67/1014 370/328 |
| 2013/0346534 A1 | 12/2013 | Richardson et al. | |
| 2014/0040412 A1 | 2/2014 | Yanagihara et al. | |
| 2014/0074961 A1 | 3/2014 | Liu et al. | |
| 2014/0122725 A1 | 5/2014 | Batrouni et al. | |
| 2014/0207818 A1 | 7/2014 | Jellick et al. | |
| 2014/0207835 A1 | 7/2014 | Jellick et al. | |
| 2014/0280763 A1 | 9/2014 | Grab et al. | |
| 2014/0282777 A1 | 9/2014 | Gonder et al. | |
| 2015/0058403 A1 | 2/2015 | He et al. | |

FOREIGN PATENT DOCUMENTS

| | | |
|---|---|---|
| CN | 101640684 | 2/2010 |
| JP | 2003223378 | 8/2003 |
| JP | 2011204252 | 10/2011 |
| JP | 2011527043 | 10/2011 |
| JP | 2013051542 | 3/2013 |

OTHER PUBLICATIONS

The European Office Action dated Aug. 7, 2017 for European Patent Application No. 14762130.4, a counterpart foreign application of U.S. Appl. No. 14/463,307, 3 pages.

Office action for U.S. Appl. No. 14/463,307, dated Jan. 31, 2017, He et al., "Method and System of Dispatching Requests in a Content Delivery Network", 11 pages.

Office action for U.S. Appl. No. 14/463,307, dated Apr. 28, 2017, He et al., "Method and System of Dispatching Requests in a Content Delivery Network", 11 pages.

Office Action for U.S. Appl. No. 14/463,307, dated Aug. 31, 2016, He et al., "Method and System of Dispatching Requests in a Content Delivery Network", 11 pages.

Office Action for U.S. Appl. No. 14/463,307, dated Sep. 11, 2017, He, "Method and System of Dispatching Requests in a Content Delivery Network" 13 pages.

PCT Search Report and Written Opinion dated Jan. 23, 2015 for PCT Application No. PCT/US14/51683, 16 Pages.

The translated Japanese Office Action dated Aug. 8, 2018, for Chinese Application No. PCT2045JP, a counterpart foreign application of U.S. Appl. No. 14/463,307, 17 pages.

The Japanese Office Action dated Apr. 23, 2019 for Japanese Patent Application No. 2016-536382, a of counterpart of U.S. Pat. No. 10,165,080, 10 pages.

The European Office Action dated Oct. 18, 2018 for European patent application No. 14762130.4, a counterpart foreign application of U.S. Appl. No. 14/463,307, 4 pages.

Machine Translation of the Chinese Office Action dated Jun. 2, 2017 for Chinese Patent Application No. 201310363395.7, a counterpart foreign application of U.S. Appl. No. 14/463,307, 25 pages.

Chinese Search Report dated May 24, 2017 for Chinese Application No. 20131036339537, 2 pages.

The Indian Office Action dated Jun. 12, 2020 for Indian Patent Application No. 201617000228, a counterpart of U.S. Pat. No. 10,165,080, 7 pages.

\* cited by examiner

METHOD AND SYSTEM OF DISPATCHING REQUESTS IN A CONTENT DELIVERY NETWORK

CROSS REFERENCE TO RELATED PATENT APPLICATION

This application is a continuation of and claims priority to U.S. patent application Ser. No. 14/463,307 filed on Aug. 19, 2014, entitled "METHOD AND SYSTEM OF DISPATCHING REQUESTS IN A CONTENT DELIVERY NETWORK," which claims foreign priority to Chinese Patent Application No. 201310363395.7 filed on Aug. 20, 2013, entitled "Method and System of Dispatching Requests in a Content Delivery Network (CDN)", which are hereby incorporated by reference in their entirety.

TECHNICAL FIELD

The present disclosure is related to the field of dispatching network requests, and more particularly, to methods and systems of precisely dispatching a request in a content delivery network.

BACKGROUND

In existing technologies, a domain name system (DNS) is referred to as a globally distributed name server system with a primary role of resolving the domain names of websites into specific server IP addresses.

In the era of the Internet, the principle of implementing acceleration by a content delivery network (CDN) is to dispatch a user's request for accessing an application to an application server capable of providing a quality service, and thereby achieving the effect of enhancing the speed and experience for the user's access to application service. In general, the dispatching modes adopted in the industry include the following:

1. A dispatching mode based on the DNS, which may be further categorized into two types:

Global DNS dispatching type: in this dispatching type, a domain name of a service accessed by a user and a CDN use the same DNS server system, as shown in FIG. 6.

The global DNS dispatching mode is achieved in a way that a client end starts sending a request for resolving the domain names of a.com and b.com to a local DNS. The local DNS sends the request to a DNS authorized by the target websites and a CDN for processing. After processing, an address of a CDN service cluster node server IP1 including a.com and b.com is returned. The local DNS forwards it to the client end, and then the client end sends a request for service contents of a.com and b.com to the CDN node server service cluster IP1 according to the address of IP1. The CDN node server service cluster IP1 then respectively requests the service content of the target websites, i.e., a.com and b.com, and received content is returned to the client end by the CDN node server service cluster IP1.

Distributed DNS dispatching type: the difference between this mode and the above global DNS dispatching type is that the authorized DNS of the service website and the authorized DNS of CDN are different systems, so it requires a conversion of a resolving privilege by means of a Canonical Name record method (CNAME). Such a method is very flexible because the service website and the CDN are mutually independent. However, since the number of resolving steps is increased, the resolution time is longer as shown in FIG. 7.

The distributed DNS dispatching mode is achieved in a way that a client end starts sending a request for resolving a domain name of a.com to a local DNS. The local DNS sends the request to a DNS authorized by the target website a.com for processing resolution, and the resolving privilege is then transferred to the DNS authorized by the target website a.com by means of CNAME (a.cdn.com). The processed result, which includes an address of a CDN node server service cluster IP1covering a.com, is then returned to the local DNS. The local DNS forwards the result to the client end, and then the client end sends a request for service content of a.com to the CDN node server service cluster IP1 according to the address of IP1. The CDN node server service cluster IP1 then requests the service content from the target website, i.e., a.com, and the received service content is returned to the client end by the CDN node server service cluster IP1.

2. A dispatching mode based on redirecting a service address: a request for service from a user is initially sent to a dispatching server. The server will dispatch the user's request to an optimal server for service by means of a specific redirecting response header (such as an http 302 response) according to attributes of the user's request (such as IP address or cookie of a client of the user, etc.) as shown in FIG. 8.

This dispatching mode is achieved in a way that a client end starts sending a request for resolving a domain name of a.com to a local DNS. The local DNS sends the request to a DNS authorized by the target website a.com for resolution. The processed result, which includes an IP address (IP0) of the target website a.com is then returned to the local DNS. The local DNS forwards the processed result to the client end and then the client requests service content from the target website a.com (IP0) according to the IP0 address. The target website a.com (IP0) then returns a 302 response for requesting a jump to the IP1. The client end at this time requests the service content of a.com from the IP1. The CDN node server service cluster IP1 then requests the service content from the target website a.com and feedbacks the received service content to the client.

3. A dispatching mode based on rewriting a uniform resource locator (URL): a system structure and a process of this node are as shown in FIG. 8. This mode is different from the above second mode in that an embedded URL in a webpage is modified for the purpose of dispatching.

This dispatching mode is achieved in a way that a client starts sending a request for resolving a domain name of a.com to a local DNS. The local DNS sends the request to a DNS authorized by the target website a.com for resolution. The processed result, which includes an IP address (IP0) of the target website a.com to the local DNS. The local DNS forwards the processed result to the client end and then the client end requests service content from the target website a.com (IP0) according to the IP0address. The target website a.com (IP0) then returns a URL request containing IP1 for requesting a jump to IP1. The client end at this time requests the service content of a.com from the IP1. A CDN node server service cluster IP1 then requests the service content from the target website a.com and feedbacks the received service content to the client end.

4. A dispatching mode based on (Anycast) any broadcasting manner, i.e., broadcasting based on either an IP address layer or an application overlapping layer. In this way, all possible service node servers may receive a service request from a user, and response content is directly returned to the user from a server that is capable of providing the best service based on rules.

5. A dispatching mode based on a P2P manner: a user negotiates with a specific service node server to find an optimal service node server. If the node server that is found after the first negotiation does not meet the service requirement, the client end is then notified to find another optimal one for service until the best service node server is found.

According to the above dispatching modes, the following deficiencies exist:

Mode 1: it is obvious to note that this mode, in which the client's located address is determined only from the local DNS's IP address, is very inaccurate since IP addresses of local DNS used by about 20% of client ends are located in networks different from IP addresses of client ends, so that an error in dispatching will easily occur, thus leading to the loss of the acceleration effect of the CDN.

Modes 2 and 3: although these modes are indeed capable of performing dispatching based on the user's IP address, the time for the resolution process is also increased in these modes as compared with the mode 1, particularly for the time needed for interacting with the application dispatching server being increased. The delay due to this interaction may affect the user's experience significantly for accessing small objects. Meanwhile, another deficiency of the mode 3 is its poor flexibility and performance, because it requires modifying page content to dispatch requests.

Mode 4: it is actually the most efficient and the most accurate method. However Anycast broadcast of IP address is not currently supported by many networks. If an application-layer Anycast is adopted, protocol compatibility will definitely be affected. It is likely to be achieved in a specific application while it is not supported by the majority of applications. Hence the mode 4 has a very poor compatibility, and especially for some specific environment, it is basically infeasible.

Mode 5: the deficiency in this mode is not only in protocol compatibility, but also in a problem of resolution efficiency. The efficiency of such P2P-based dispatching mode decreases significantly with the increase in number of service nodes.

Accordingly, the drawbacks in the above dispatching modes have become a technical issue to be solved urgently.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

In view of the above, the objective of the present disclosure is to provide a method for precisely dispatching a request by use of a CDN and a system using the same to solve the issue of low processing efficiency in CDN caused by additional resolution time needed in the process of dispatching IP address and the issue of IP address error during the dispatching process.

In order to resolve the aforementioned technical issue, the present disclosure discloses a method for precisely dispatching a request by use of a content delivery network (CDN), which comprises: enabling a domain name system (DNS) authorized by CDN of a target website to receive, from a local DNS of a terminal on which a client is located, an IP address of the local DNS to and a domain name of a target website of service content requested by the client; finding, in a shared dispatching database, an address of an optimal CDN node server of the target website that is suitable to provide service to the client based on the IP address of the local DNS and the domain name of the target website, and returning the found address to the client, wherein an IP address segment, the domain name of the target website and an address of at least one CDN node server of the target website are correspondingly stored in the shared dispatching database; and obtaining, from service content stored in the optimal CDN node server, the service content of the target website requested by the client, and thereafter returning the service content of the target website to the client, if the optimal CDN node server determines that an IP address segment thereof, which is suitable to provide services, contains the IP address of the client after receiving the request for the service content of the target website from the client.

In an embodiment, the method further comprises: searching, in the shared dispatching database, by the optimal CDN node server, an address of another CDN node server of the target website which is suitable to provide service to the client, based on the IP address of the client and the domain name of the target website that is requested for the service content by the client, and returning the IP address of the other CDN node server of the target website to the client, if the optimal CDN node server determines that the IP address segment of the optimal CDN node server, which is suitable to provide service, does not contain the IP address of the client; and obtaining, from service content stored in the other CDN node server, the service content of the target website requested by the client, and returning the service content of the target website to the client, if the other CDN node server determines that the IP address segment of the other CDN node server, which is suitable to provide service, contains the IP address of the client after the other CDN node server receives the request, sent from the client, for obtaining the service content of the target website.

Additionally or alternatively, the method further comprises: notifying the client to enable the client to search, in the shared dispatching database, an address of another CDN node server of the target website that is suitable to provide service to the client based on the IP address of the client and the domain name of the target website that is requested for the service content by the client if the optimal CDN node server determines that the IP address segment of the optimal CDN mode server, which is suitable to provide service, does not contain the IP address of the client; and obtaining, from service content stored in the other CDN node server, the service content of the target website requested by the client, and returning the service content of the target website to the client, if the other CDN node server determines that the IP address segment contains the IP address of the client after the other CDN node server receives the request, sent from the client, for obtaining the service content of the target website.

In another embodiment, obtaining, from the service content stored in the optimal CDN node server, the service content of the target website requested by the client and returning the service content of the target website to the client further comprises: the optimal CDN node server requesting to obtain the service content requested by the client from the target website, storing and forwarding the requested service content to the client, if the service content stored in the optimal CDN node server does not contain the service content requested by the client.

In an embodiment, obtaining, from the service content stored in the other CDN node server, the service content of the target website requested by the client, and returning the service content of the target website to the client further comprises: the other CDN node server requesting to obtain the service content requested by the client from the target website, storing and forwarding the requested service content to the client, if the service content stored in the other CDN node server does not contain the service content requested by the client.

Furthermore, before the DNS authorized by the CDN of the target website receiving the IP address of the local DNS of terminal on which the client is located and the domain name of the target website of the service content requested by the client, the method further comprises: receiving and resolving, by the DNS authorized by the CDN of the target website, the domain name of the target website that is sent by the local DNS for obtaining the service content of the target website, and returning an alias of the target website that is obtained from the resolving to the client, in which the alias is directed to an address of the DNS authorized by the CDN of the target website.

In order to resolve the aforementioned technical issues, the present disclosure discloses a system for precisely dispatching a request by use of a content delivery network (CDN), the system being coupled to a client, the system comprising a target website CDN authorizing domain name server, a shared dispatching database and an optimal CDN node server, wherein the target website CDN authorizing domain name server is used for receiving, from a local DNS of a terminal on which a client is located, an IP address of the local DNS and a domain name of a target website of service content requested by a client, sending the IP address and the domain name to the shared dispatching database, and returning an address of an optimal CDN node server, which is returned by the shared dispatching database, to the client; the shared dispatching database is used for providing the address of the optimal CDN node server of the target website that is suitable to provide service to the client based on the IP address of the local DNS and the domain name of the target website, and returning the address to the target website CDN authorizing domain name server, wherein an IP address segment, the domain name of the target website and at least one CDN node server address of the target website are correspondingly stored in the shared dispatching database; and the optimal CDN node server is used for obtaining the service content of the target website requested by the client from service content stored therein and returning the service content of the target website to the client, if the optimal CDN node server determines that an IP address segment thereof, which is suitable to provide service, contains the IP address of the client after the optimal CDN node server receives the request, sent from the client, for obtaining the service content of the target website.

In an embodiment, the system further comprises another CDN node server, wherein the optimal CDN node server is further used for sending an IP address of the client and the domain name of the target website, which is requested for the service content by the client, to the shared dispatching database, if the optimal CDN node server determines that the IP address segment of the optimal CDN node server, which is suitable to provide service, does not contain the IP address of the client, and returning an IP address of the other CDN node server of the target website, which is returned by the shared dispatching database, to the client; the shared dispatching database is further used for providing the address of the CDN node server of the target website that is suitable to provide service to the client based on the IP address of the client sent by the optimal CDN node server and the domain name of the target website that is requested for the service content by the client, and returning the IP address of the other CDN node server to the client; and the other CDN node server is used for obtaining the service content of the target website requested by the client from service content stored in the other CDN node server, and returning the service content of the target website to the client, if the other CDN node server determines that an IP address segment contains the IP address of the client after the other CDN node server receives the request, sent from the client, for obtaining the service content of the target website.

In another embodiment, the system further comprises another CDN node server, wherein the optimal CDN node server is further used for notifying the client if the optimal CDN node server determines that the IP address segment of the optimal CDN node server, which is suitable to provide service to the client, does not contain the IP address of the client; the shared dispatching database is further used for providing an address of the other CDN node server of the target website that is suitable to provide service to the client based on the IP address of the client and the domain name of the target website of the service content requested by the client, and returning the address to the client; and the other CDN node server, which is used for obtaining the service content of the target website requested by the client from service content stored in the other CDN node server, and returning the service content of the target website to the client, if the other CDN node server determines that an IP address segment contains the IP address of the client after the other CDN node server receives the request, sent from the client, for obtaining the service content of the target website.

Furthermore, the system further comprises a target website server, wherein the optimal CDN node server is further used for requesting and obtaining the service content of the target website requested by the client from the target website server, storing and forwarding the service content of the target web site requested by the client to the client if the service content stored in the optimal CDN node server does not contain the service content requested by the client; and the target website server is used for storing and providing service content corresponding to the target website.

In an embodiment, the system further comprises a target website server, wherein the other CDN node server is further used for requesting and obtaining the service content of the target website requested by the client from the target website server, storing and forwarding the service content of the target web site requested by the client to the client, if the service content stored in the other CDN node server does not contain the service content requested by the client; and the target website server is used for storing and providing service content corresponding to the target website.

Additionally or alternatively, the system further comprises a target website authorizing domain name server used for receiving and resolving the domain name of the target website of the service content requested by the client that is sent by the local DNS, and returning an alias of the target website that is obtained after the resolving to the client, the alias being directed to an address of the DNS authorized by the CDN of the target website.

In comparison with conventional methods, the present disclosure is capable of achieving the following effects:

The method for precisely dispatching a request by use of a CDN and a system using the same provided by the present disclosure are capable of solving the issue of low processing efficiency in CDN caused by the increase in resolution time needed in the process of dispatching IP address and the issue of IP address error during the dispatching process.

The method for precisely dispatching a request by use of a CDN and a system using the same provided by the present disclosure are further able to process a network that does not support Anycast broadcast so as to achieve IP dispatching without lowering the dispatching efficiency due to the decrease in resolution efficiency.

Of course, any product that implements the method and the system provided by the present disclosure does not need to achieve all of the aforementioned effects at once.

BRIEF DESCRIPTION OF THE DRAWINGS

The drawings described herein are used to provide a further understanding of the present disclosure, and are incorporated to constitute a part of the present disclosure, in which the schematic embodiments and descriptions thereof are used for explaining purpose only and should not be construed as inappropriate limitations to the present disclosure. In the drawings.

DETAILED DESCRIPTION

The technical schemes of the present disclosure will be described in a clear and complete manner below with the embodiments and accompanying drawings in order to make the objectives, technical schemes and advantages of the present disclosure more clear. The embodiments described herein are only a part of, not all of, the embodiments of the present disclosure. According to the embodiments of the present disclosure, any other embodiments implemented by a person having ordinary skill in the art without creative effort should be included in the scope of protection of the present disclosure.

Figure 1:
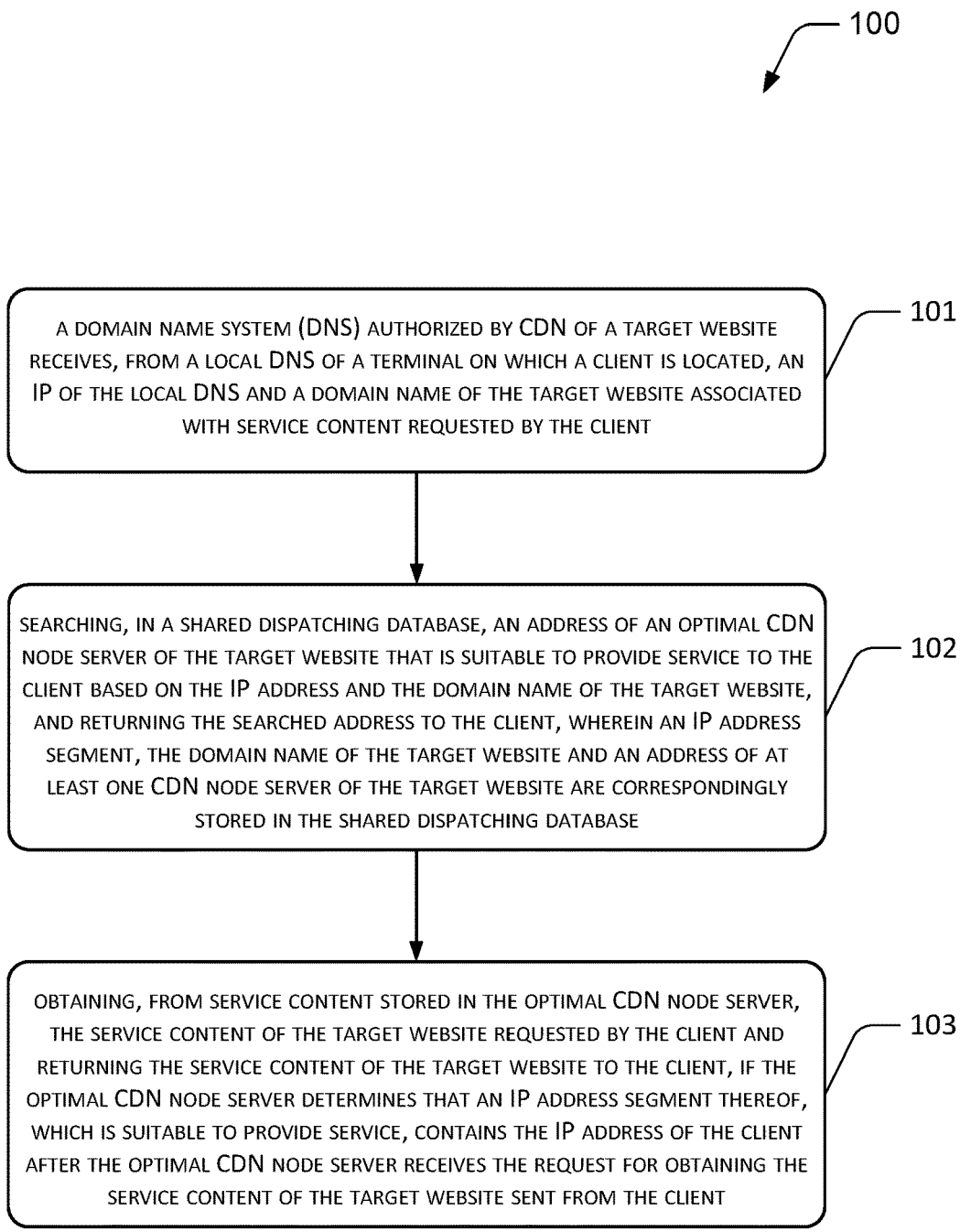
FIG. 1 is a flowchart illustrating a method for precisely dispatching a request according to a first embodiment of the present disclosure.

As shown in FIG. 1, a flowchart illustrates a method for precisely dispatching a request according to a first embodiment of the present disclosure, which includes the following blocks:

Block 101: a domain name system (DNS) authorized by CDN of a target website receives, from a local DNS of a terminal on which a client is located, an IP of the local DNS and a domain name of the target website associated with service content requested by the client.

Block 102: searching, in a shared dispatching database, an address of an optimal CDN node server of the target website that is suitable to provide service to the client based on the IP address and the domain name of the target website, and returning the searched address to the client, wherein an IP address segment, the domain name of the target website and an address of at least one CDN node server of the target website are correspondingly stored in the shared dispatching database.

The above term "optimal" is obtained based on a specific criterion of determination. For example, when a client end requests to access to a CDN node server under a normal situation, a CDN node server providing the fastest download speed is determined to be "optimal" when a download speed for content provided by CDN node server is used as a criterion for determining the optimum. Of course, the present disclosure is not limited thereto. There may be other criterions different from the fastest download speed to determine "optimum" for different types of CDN node servers. The term "optimal" as used hereinafter will follow the above principle.

Block 103: obtaining, from service content stored in the optimal CDN node server, the service content of the target website requested by the client and returning the service content of the target website to the client, if the optimal CDN node server determines that an IP address segment thereof, which is suitable to provide service, contains the IP address of the client after the optimal CDN node server receives the request for obtaining the service content of the target website sent from the client.

If the service content stored in the optimal CDN node server does not contain the service content requested by the client, the optimal CDN node server sends a request to the target website for obtaining the service content requested by the client, stores and forwards the requested service content to the client.

Block 102 may further includes

If the optimal CDN node server determines that the IP address segment thereof, which is suitable to provide services, does not contain the IP address of the client after the optimal CDN node server receives the request for obtaining the service content of the target website sent from the client end, the following two processes are included:

The optimal CDN node server searches for an address of another CDN node server of the target website suitable for providing service to the client based on the IP address of the client and the domain name of the target website that is requested for the service content by the client in the shared dispatching database, and returns an IP address of the other CDN node server of the target website to the client; or The optimal CDN node server notifies the client to enable the client to search for the address of the other CDN node server of the target website suitable for providing service to the client based on the IP address of the client and the domain name of the target website in the shared dispatching database.

The other CDN node server receives a request from the client for obtaining the service content of the target website, obtains the service content requested by the client from service content stored in the other CDN node server, and returns the service content of the target website to the client if the other CDN node server determines that an IP address segment thereof contains the IP address of the client. If the service content stored in the other CDN node server does not contain the service content requested by the client, the other CDN node server requests to obtain the service content that is requested by the client from the target website, stores and forwards the requested service content to the client.

It should be noted that, although the process 1 and the process 2 are logically different, they have the same effect of resolving the issue. In a practical implementation, a person with ordinary skill in the art may change the options according to the actual condition, which are not particularly limited herein and the details thereof are not redundantly described herein.

In addition, a specific operation is normally needed before block 101 of the first embodiment, which may include: a DNS server, which is authorized by the target website, receiving the request sent by the local DNS for obtaining the service content of the target website requested by the client, resolving the domain name of the target website, and returning an alias, i.e., CNAME, of the target website, that is obtained after the resolving, in which the alias points to the IP address of the DNS server authorized by the CDN of the target website.

Figure 2:
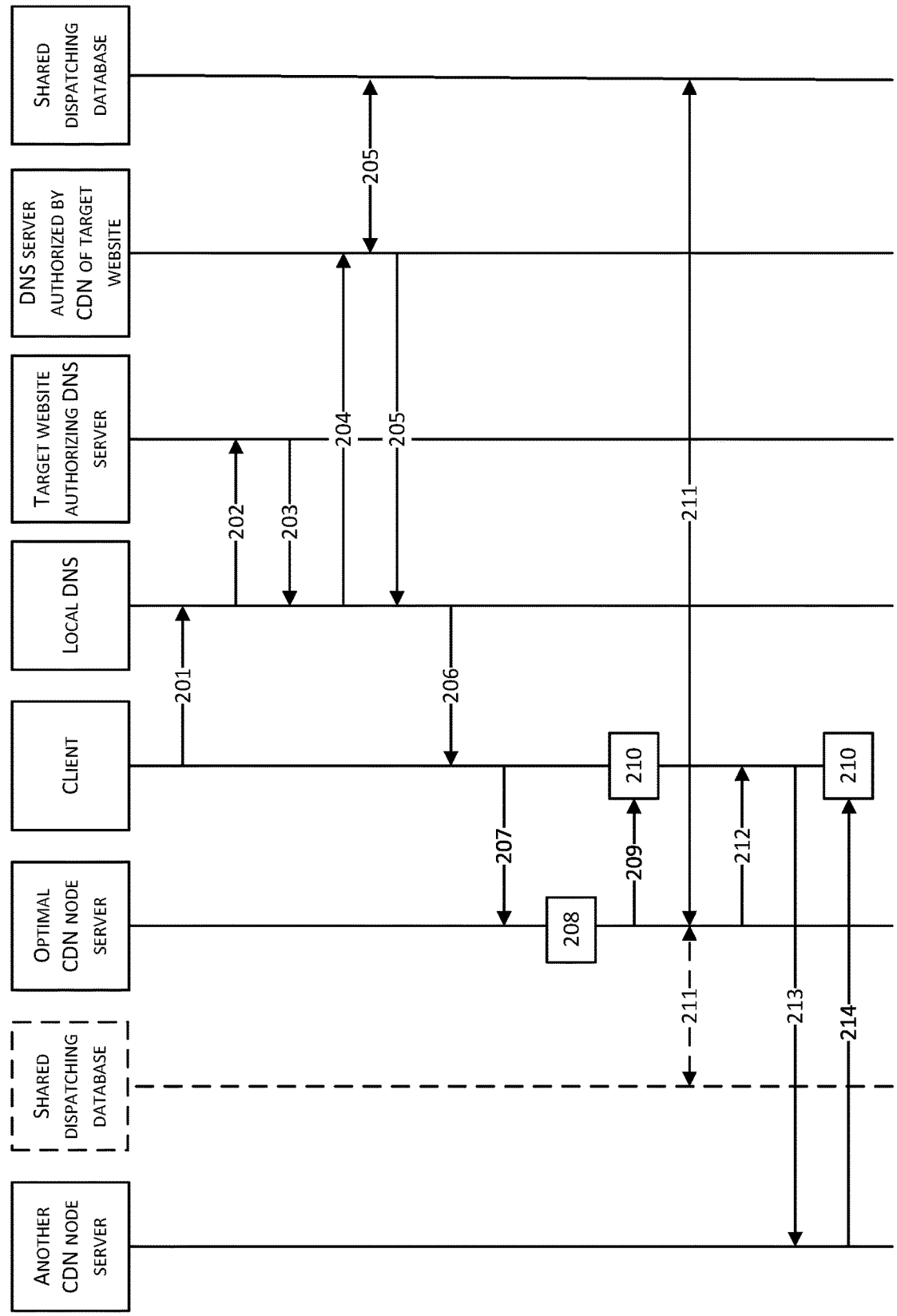
FIG. 2 is a flowchart illustrating a method for precisely dispatching a request according to a second embodiment of the present disclosure.

As shown in FIG. 2, a flowchart illustrates a method for precisely dispatching a request according to a second embodiment of the present disclosure, which includes the following blocks:

Block 201: when a client intends to request service content from a target website, the client first sends a domain name resolution request to a local DNS of a terminal on which the client is located, the domain name resolution request including a domain name (a.com) of the target website. The description hereinafter will use a.com, but the use of a.com shall not be deemed as a limitation to the present disclosure.

Block 202: the local DNS forwards the domain name resolution request to a DNS server authorized by the target website.

Block 203: the DNS server authorized by the target website receives the domain name resolution request sent by the local DNS, performs resolution based on the domain name of the target website in the request, obtains an alias (i.e., CNAME) of the target website corresponding to the domain name, e.g. a.cdn.com (a.cdn.com is used hereinafter for description, but a.cdn.com is not a limitation to the present disclosure), and returns the alias, a.cdn.com, to the local DNS, wherein the alias, a.cdn.com, points to an IP address of the DNS server authorized by the CDN of the target website.

Block 204: the local DNS sends a request for resolving an IP address of a CDN node server to the DNS server authorized by the CDN of the target website based on the alias, a.cdn.com, of the target website, wherein the request for resolving the address includes an IP address of the local DNS and the domain name, a.com, of the target website.

Block 205: the DNS server authorized by the CDN of the target website receives the request for resolving the IP address from the local DNS, and searches for an IP address of an optimal CDN node server of the target website suitable for providing service to the client from the shared dispatching database, and returns the IP address of the optimal CDN node server of the target website to the client.

An IP address segment, the domain name, a.com, of the target website and an IP address of at least one CDN node server of the target website are correspondingly stored in the shared dispatching database. It should be noted that the IP address segment recorded in the shared dispatching database is an IP address segment to which the supported client belongs rather than an IP address segment to which the supported local DNS belongs. The IP address of the local DNS and the IP address of the client may be the same, or may be different, and the use of the IP address of the local DNS at block 205 for performing the search in the shared dispatching database may find a CDN node server with an IP address that is not applicable to the client. In this case, block 208 is used to detect the IP address of the client. The inapplicability indicates that the IP address of the local DNS is different from the IP address of the client, and block 211 is needed for modification. It is also possible that the IP address of the CDN node server is applicable to the client, which indicates that the IP address of the local DNS is the same as the IP address of the client.

Block 206: the local DNS forwards the IP address of the optimal CDN node server to the client.

Block 207: the client sends a content acquisition request to the optimal CDM node server based on the IP address of the optimal CDN node server, requesting to obtain the service content of the target website, where the content acquisition request includes at least the IP address of the client.

In this embodiment, the content acquisition request further includes the domain name (a.com) of the target website because the CDN node server needs to not only determine whether the client is applicable based on the IP address of the client, but also take the responsibility of carrying out modification in the shared dispatching database upon determining that the client is not applicable. Therefore, the content acquisition request in this embodiment further includes the domain name (a.com) of the target website. Certainly, it is possible that the domain name a.com of the target website may already be known to the CDN node server of the target website itself. In this case, the content acquisition request in this embodiment may not need to include the domain name (a.com) of the target website.

Block 208: the optimal CDN node server receives the content acquisition request from the client, determines whether an IP segment, which is suitable for providing services of the optimal CDN node server, contains the IP address of the client. If contained, it explains that the IP address of the local DNS is the same as the IP address of the client and the optimal CDN node server found out via the IP address of the local DNS in block 205 is capable of providing service normally, and block 209 is executed. If not, it explains that the IP address of the local DNS is different from the IP address of the client, and the optimal CDN node server found out via the IP address of the local DNS in block 205 is incapable of providing service normally, and block 211 is executed.

Block 209: the service content of the target website requested by the client is obtained from service content that is stored in the optimal CDN node server, and is returned to the client.

If the service content stored in the optimal CDN node server does not contain the service content requested by the client, the optimal CDN node server then requests to obtain the service content requested by the client from the target website, stores and forwards the requested service content to the client.

Block 210: the client accesses and displays the requested service content of the target website. The process is ended.

Block 211: the optimal CDN node server searches for an address of another CDN node server of the target website that is suitable to provide service to the client in the shared dispatching database based on the IP address of the client and the domain name (a.com) of the target website that are included in the content acquisition request.

Block 212: the optimal CDN node server returns a found IP address to the client.

Block 213: the client sends a content acquisition request to the other CDN node server based on the IP address of the other CDN node server, requesting to obtain the service content of the target website, wherein the content acquisition request includes the IP address of the client and the domain name (a.com) of the target website.

Block 214: the other CDM node server receives the content acquisition request from the client, reads the service content of the target website from service content stored in the other CDN node server if the other CDN node server verifies that an IP addresses segment of the other CDN node server, which is suitable to provide service, contains the IP address of the client, and returns the service content of the target website to the client. Block 210 is then performed.

If the service content stored in the other CDN node server does not contain the service content requested by the client, the other CDN node server requests to obtain the service content requested by the client from the target website, stores and forwards the requested service content to the client. Block 210 is then performed.

It should be noted that the shared dispatching database used at blocks 205 and 211 may be in a form of a cluster. In other words, the DNS server authorized by the CDN of the target website and the optimal CDN node server may use the same shared dispatching database in a clustering form, and all network-side servers search information in this clustered and shared dispatching database (as shown by a solid line that represents the shared dispatching database used by the optimal CDN node server at block 211 is the same as that used at block 205).

The shared dispatching database used at block 205 and 211 may be distributed. In other words, shared dispatching databases are distributed in the neighborhood of the DNS server authorized by the CDN of the target website and the optimal CDN node server. Data in these distributed shared dispatching databases is synchronized. The DNS server authorized by the CDN of the target server and the optimal CDN node server respectively uses the shared dispatching databases in respective neighborhood to search information (as shown by a dotted line that represent block 211, where the optimal CDN node server uses another shared dispatching database when perform a search).

Figure 3:
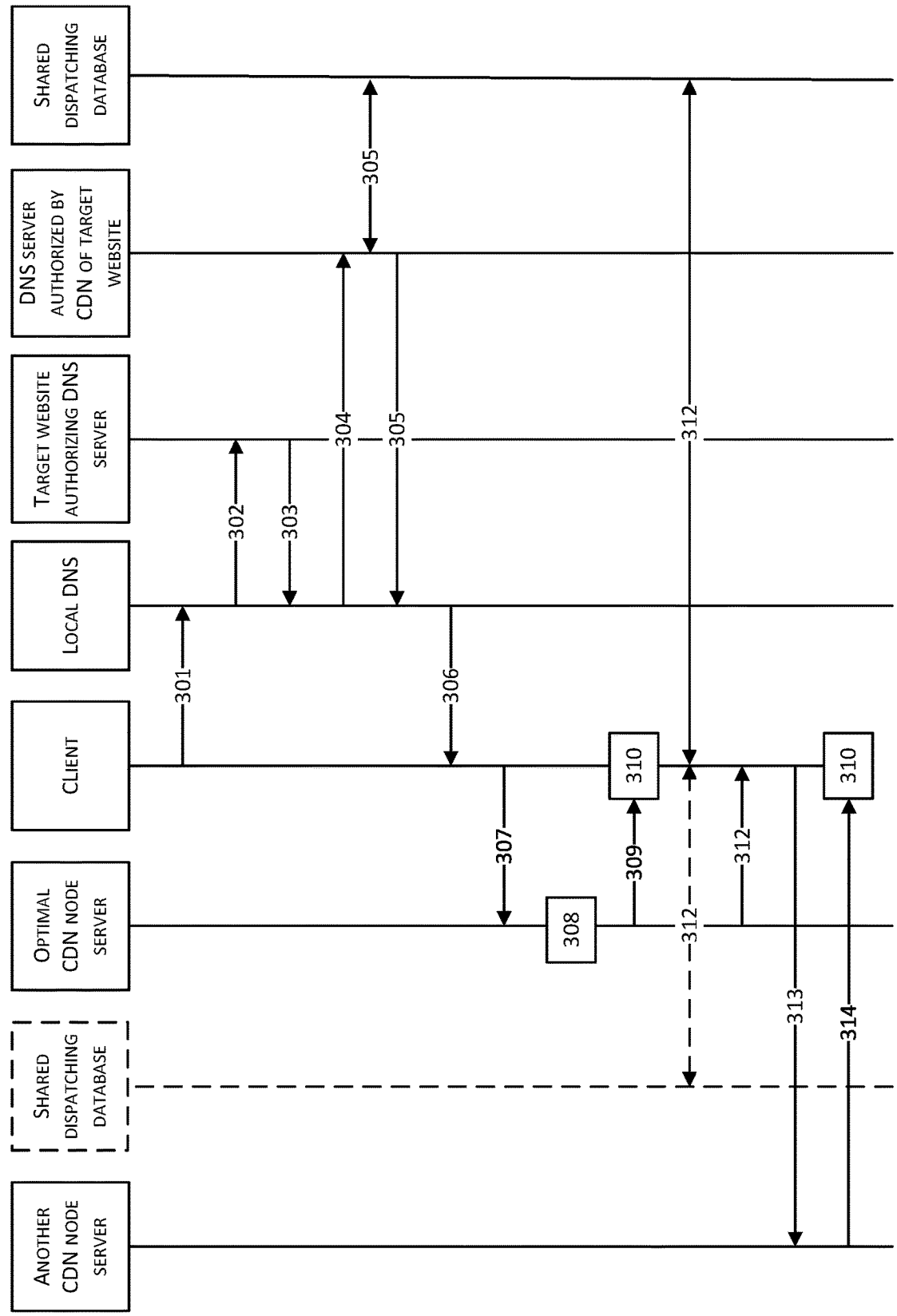
FIG. 3 is a flowchart illustrating a method for precisely dispatching a request according to a third embodiment of the present disclosure.

As shown in FIG. 3, a method for precisely dispatching a request by use of a CDN according to a third embodiment of the present disclosure is illustrated, wherein the method includes the following blocks:

Block 301: when a client end intends to request service content from a target website, the client first sends a domain resolution request a local DNS of a terminal in which the client is located, wherein the domain resolution request includes a domain name, i.e., a.com, of the target website. Hereinafter the a.com is used, but the use of a.com shall not be deemed as a limitation to the present disclosure.

Block 302: the local DNS forwards the domain resolution request a DNS server authorized by the target website.

Block 303: the DNS server authorized by the target website receives the domain resolution request sent by the local DNS, performs resolution based on the domain name of the target website in the request, obtains an alias (i.e., CNAME) of the target website corresponding to the domain name, e.g. a.cdn.com (a.cdn.com is used hereinafter for description, but a.cdn.com is not a limitation to the present disclosure), and returns the alias, a.cdn.com, to the local DNS, wherein the alias, a.cdn.com, points to an IP address of the DNS server authorized by the CDN of the target website.

Block 304: the local DNS sends a request for resolving an IP address of a CDN node server to the DNS server authorized by the CDN of the target website based on the alias, a.cdn.com, of the target website, wherein the request for resolving the address includes an IP address of the local DNS and the domain name, a.com, of the target website.

Block 305: the DNS server authorized by the CDN of the target website receives the request for resolving the IP address from the local DNS, and searches for an IP address of an optimal CDN node server of the target website suitable for providing service to the client from the shared dispatching database, and returns the IP address of the optimal CDN node server of the target website to the client.

An IP address segment, the domain name, a.com, of the target website and an IP address of at least one CDN node server of the target website are correspondingly stored in the shared dispatching database. It should be noted that the IP address segment recorded in the shared dispatching database is an IP address segment to which the supported client belongs rather than an IP address segment to which the supported local DNS belongs. The IP address of the local DNS and the IP address of the client may be the same, or may be different, and the use of the IP address of the local DNS at block 305 for performing the search in the shared dispatching database may find a CDN node server with an IP address that is not applicable to the client. In this case, block 308 is used to detect the IP address of the client. The inapplicability indicates that the IP address of the local DNS is different from the IP address of the client, and block 311 is needed for modification. It is also possible that the IP address of the CDN node server is applicable to the client, which indicates that the IP address of the local DNS is the same as the IP address of the client.

Block 306: the local DNS forwards the IP address of the optimal CDN node server to the client.

Block 307: the client sends a content acquisition request to the optimal CDM node server based on the IP address of the optimal CDN node server, requesting to obtain the service content of the target website, where the content acquisition request includes at least the IP address of the client.

Different from the content acquisition request in the second embodiment, the content acquisition request in this embodiment only includes the IP address of the client because the CDN node server only determines whether the client is applicable, and the CDN node server is not responsible for carrying out modification in the shared dispatching database if the client is determined to be not applicable. Rather, the client will perform a search in the shared dispatching database on its own. Hence, the content acquisition request in this embodiment does not need to include the domain name, a.com, of the target website.

Block 308: the optimal CDN node server receives the content acquisition request from the client, determines whether an IP segment, which is suitable for providing services of the optimal CDN node server, contains the IP address of the client. If contained, it explains that the IP address of the local DNS is the same as the IP address of the client and the optimal CDN node server found out via the IP address of the local DNS in block 305 is capable of providing service normally, and block 309 is executed. If not, it explains that the IP address of the local DNS is different from the IP address of the client, and the optimal CDN node server found out via the IP address of the local DNS in block 305 is incapable of providing service normally, and block 311 is executed.

Block 309: the service content of the target website requested by the client is obtained from service content that is stored in the optimal CDN node server, and is returned to the client.

If the service content stored in the optimal CDN node server does not contain the service content requested by the client, the optimal CDN node server then requests to obtain the service content requested by the client from the target website, stores and forwards the requested service content to the client.

Block 310: the client accesses and displays the requested service content of the target website. The process is ended.

Block 311: the optimal CDN node server notifies the client.

Block 312: the client end automatically logs into a shared dispatching database platform that is able to directly connect to the shared dispatching database, and the client searches an address of another CDN node server of the target website that is suitable to provide service to the client based on the IP address of the client and the domain name (a.com) of the target website.

Block 313: the client sends a content acquisition request to the other CDM node server based on the IP address of the other CDN node server, wherein the content acquisition request includes the IP address of the client.

Block 314: the other CDM node server receives the content acquisition request from the client, reads the service content of the target website from service content stored in the other CDN node server if the other CDN node server verifies that an IP addresses segment of the other CDN node server, which is suitable to provide service, contains the IP address of the client, and returns the service content of the target website to the client. Block 310 is then performed.

If the service content stored in the other CDN node server does not contain the service content requested by the client, the other CDN node server requests to obtain the service content requested by the client from the target website, stores and forwards the requested service content to the client. Block 310 is then performed.

It should be noted that the shared dispatching database used at blocks 305 and 312 may be in a form of a cluster. In other words, the DNS server authorized by the CDN of the target website and the client may use the same shared dispatching database in a clustering form, and all local clients search information in this clustered and shared dispatching database (as shown by a solid line that represents the shared dispatching database used by the client at block 312 is the same as that used at block 305).

The shared dispatching database used at blocks 305 and 312 may be distributed. In other words, shared dispatching databases are distributed in the neighborhood of the DNS server authorized by the CDN of the target website and the client. Data in these distributed shared dispatching databases is synchronized. The DNS server authorized by the CDN of the target server and the client respectively uses the shared dispatching databases in respective neighborhood to search information (as shown by a dotted line that represent block 312, where the client uses another shared dispatching database when perform a search).

Figure 4:
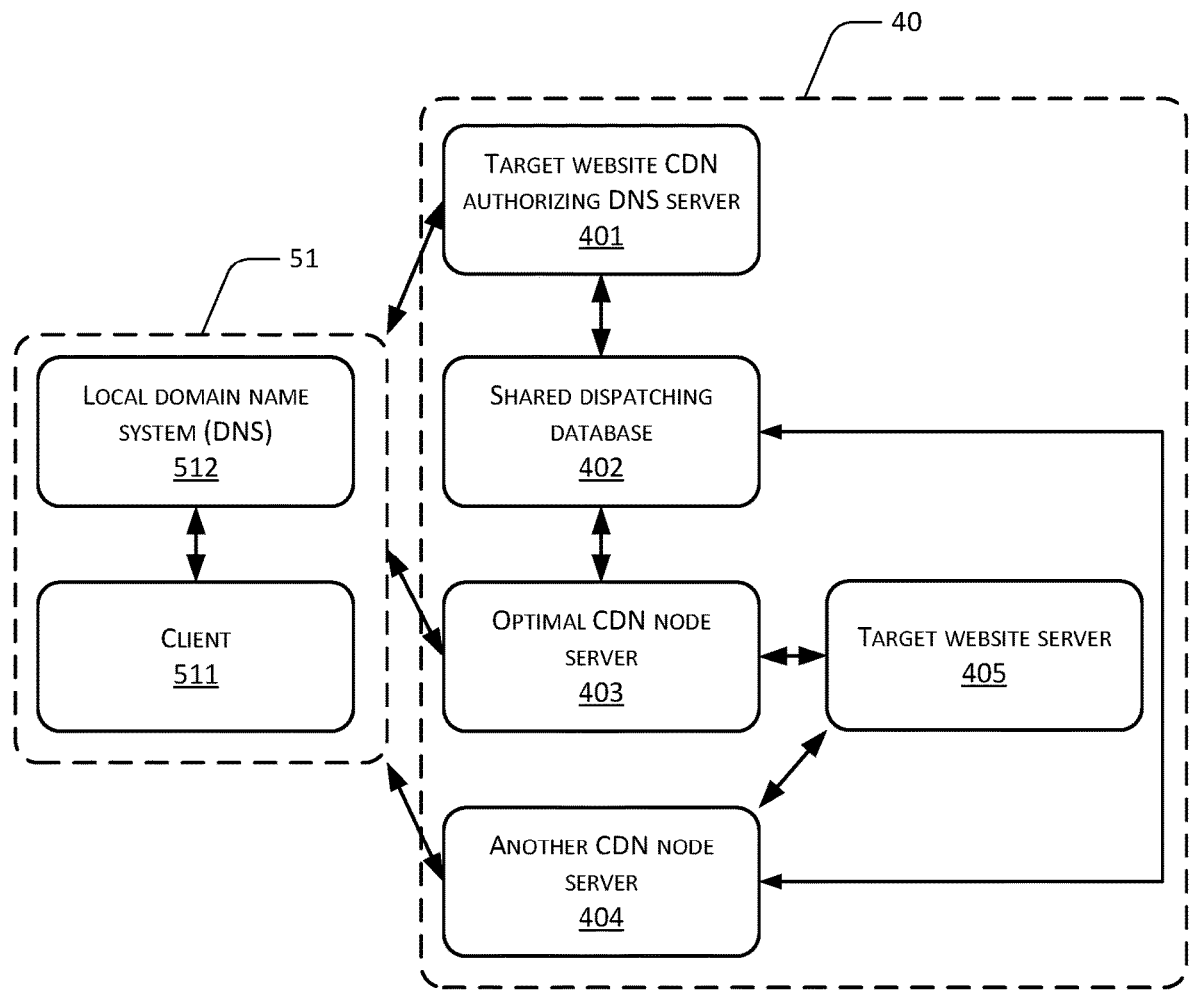
FIG. 4 is a structural diagram illustrating a system for precisely dispatching a request according to a fourth embodiment of the present disclosure.
Figure 5:
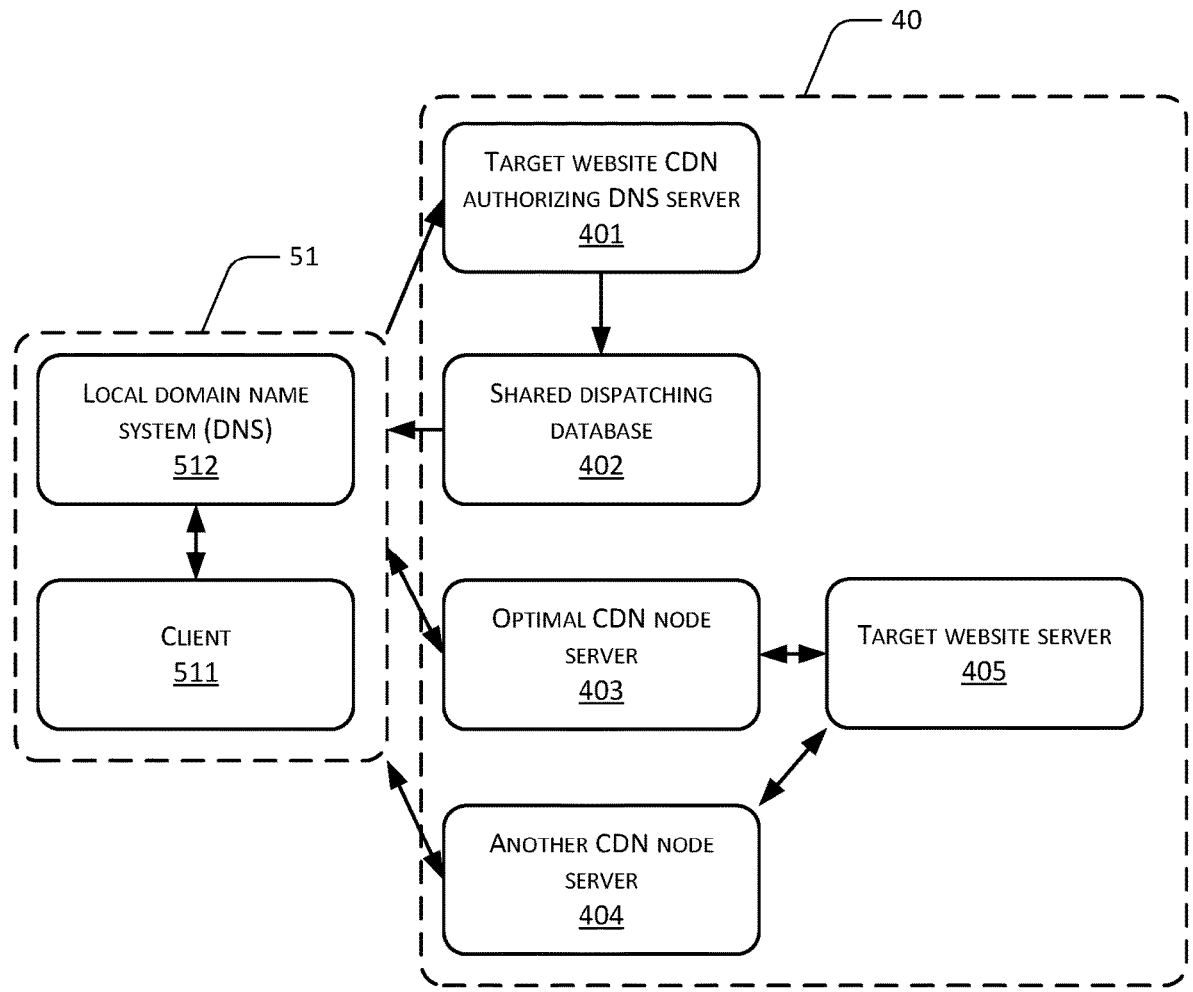
FIG. 5 is another structural diagram illustrating a system for precisely dispatching a request according to the fourth embodiment of the present disclosure.
Figure 6:
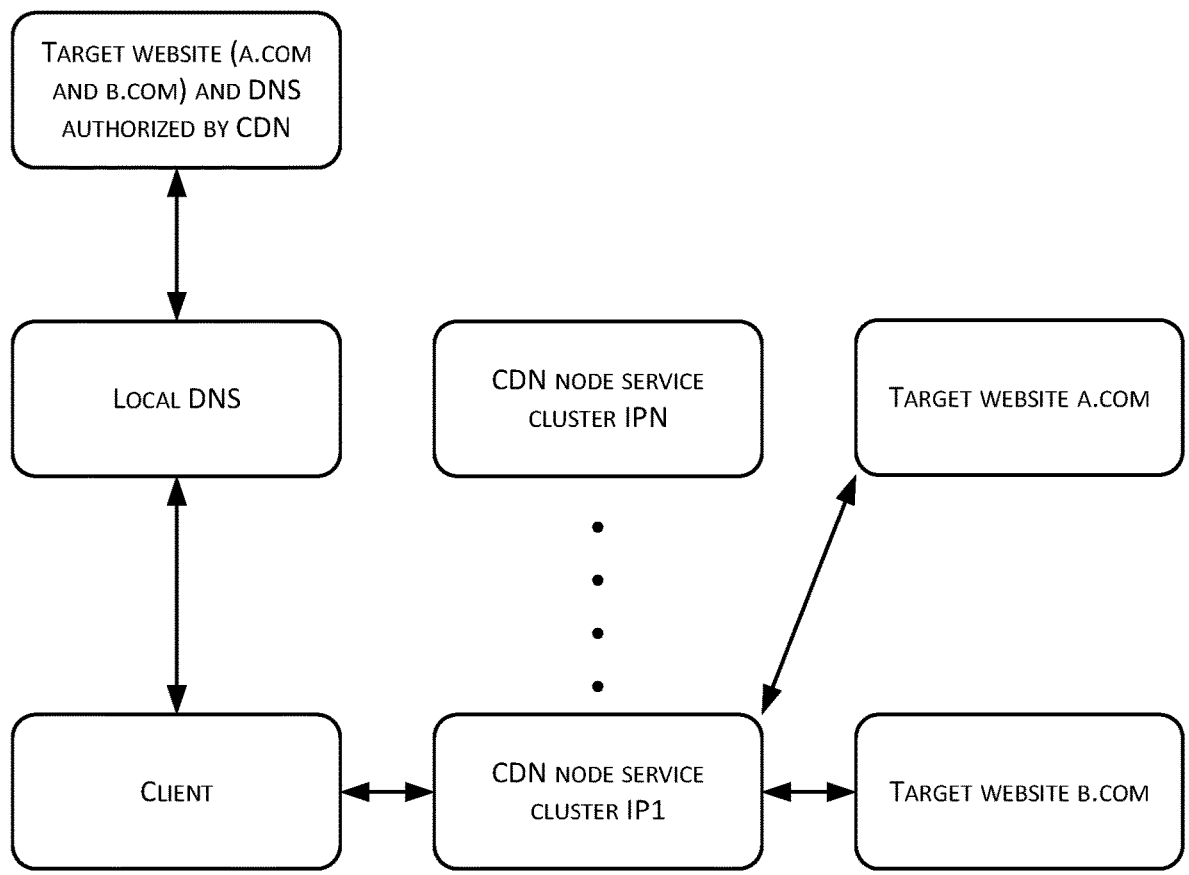
FIGS. 6-8 are structural diagrams illustrating existing dispatching methods on a CDN mentioned in the background technologies.
Figure 7:
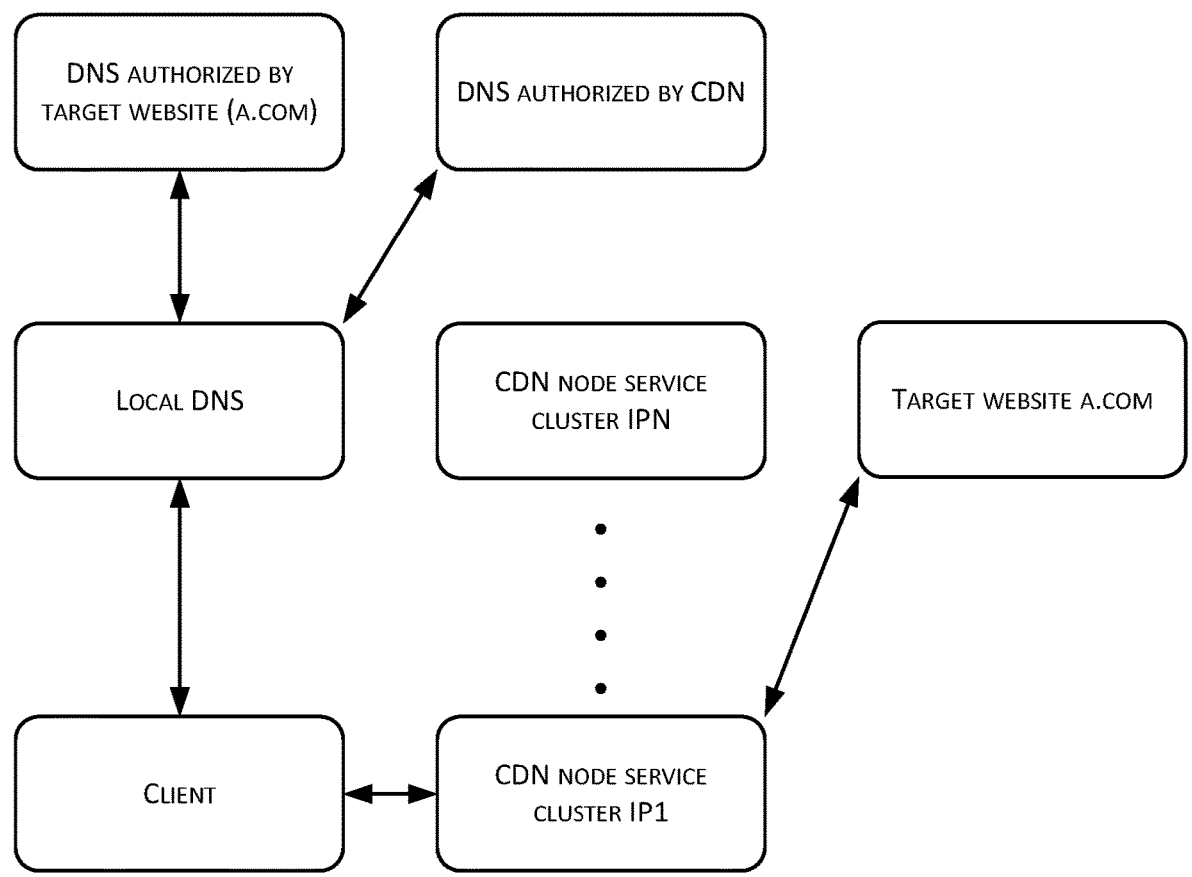
Figure 8:
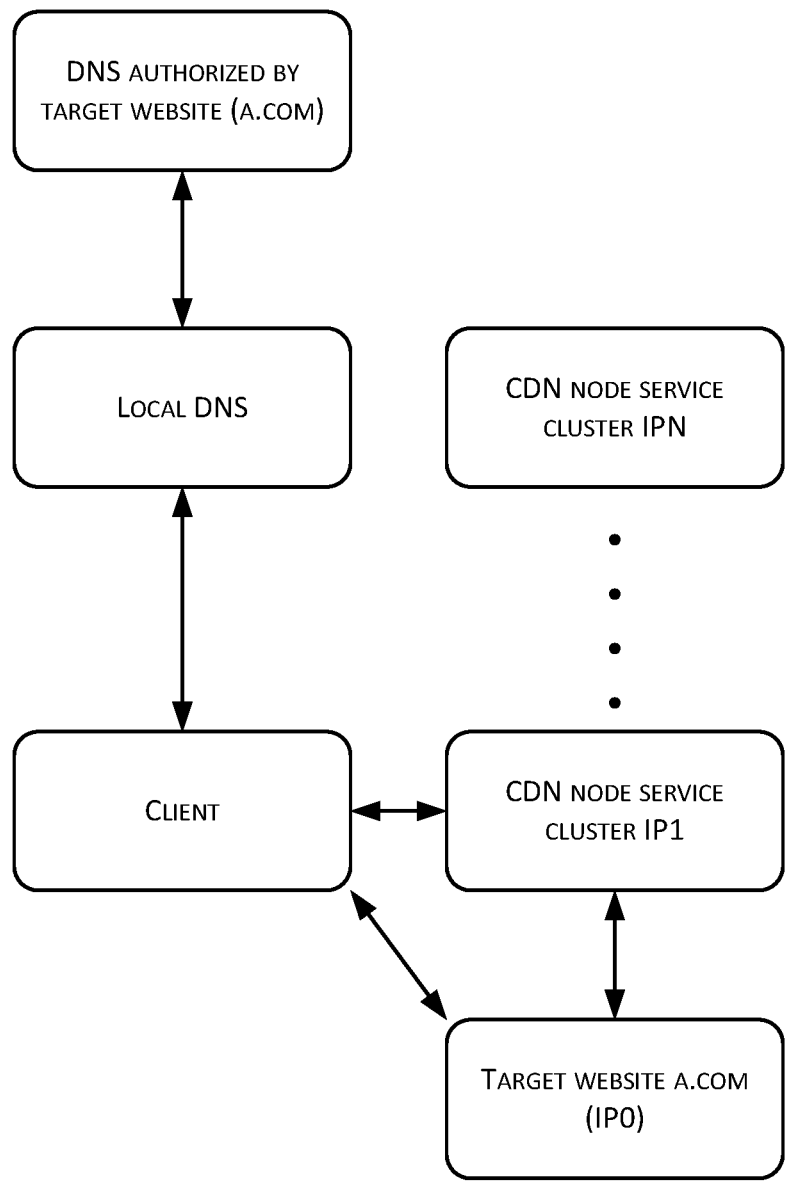

As shown in FIGS. 4 and 5, a system 40 for precisely dispatching requests according to a fourth embodiment of the present disclosure is illustrated, wherein the system 40 is coupled to a terminal 51 (that includes a client 511 and a local domain name system (DNS) 512 of the terminal 51 in which the client 511 is located). The system 40 comprises a DNS server 401 authorized by a CDN of a target website, a shared dispatching database 402 and an optimal CDN node server 403.

The DNS server 401 authorized by the CDN of the target website, which is respectively coupled to the terminal 51 and the shared dispatching database 402, and is used to receive, from the local DNS 512, an IP address of the local DNS 512 and a domain name of the target website which is requested for service content by the client end 511, send the IP address of the local DNS 512 and the domain name of the target website to the shared dispatching database 402, and return an address of an optimal CDN node server 403 returned by the shared dispatching database 402 to the client 511.

The shared dispatching database 402, which is coupled to the DNS server 401 authorized by the CDN of the target website, is used for providing the address of the optimal CDN node server 403 of the target website that is suitable for providing service to the client 511 based on the IP address of the local DNS and the domain name of the target website, and returning the address to the DNS server 401 authorized by the CDN of the target website, wherein an IP address segment, the domain name of the target website and an address of at least one CDN node server are correspondingly stored in the shared dispatching database 402.

The optimal CDN node server 403, which is coupled to the client 511, is used for receiving the request for obtaining the service content of the target website from the client end 511, and obtaining the service content of the target website requested by the client end 511 from service content stored in the optimal CDN node server 403 and returning the service content of the target website to the client 511 when determining that the IP address segment which is suitable for providing services contains the IP address of the client 511.

In addition, the system 40 further comprises: another CDN node server 404 which is used for receiving a request from the client 511 to obtain the service content of the target website, obtaining the service content of the target website requested by the client 511 from stored service content and returning the service content of the target website to the client 511 upon determining that an IP address segment thereof, which is suitable for providing services, contains the IP address of the client 511.

In order to redirect to the other CDN node server 404, there are two kinds of structure with respect to a relationship among the shared dispatching database 402, the optimal CDN node server 403 and the client 511:

As shown in FIG. 4, the optimal CDN node server 403 is coupled to the shared dispatching database 402, and the client 511 is not coupled to the shared dispatching database 402.

The optimal CDN node server 403 is used for sending the IP address of the client 511 and the domain name of the target website which is requested for the service content by the client 511 to the shared dispatching database 402 and returning the IP address of the other CDN node server of the target website returned by the shared dispatching database 402 to the client 511 when determining that the IP address segment of the optimal CDN node server 403, which is suitable for provide services, does not contain the IP address of the client end.

The shared dispatching database 402 is further used for providing an address of another CDN node server 404 of the target website that is suitable for providing service to the client 511 based on the IP address of the client end 511 sent by the optimal CDN node server 403 and the domain name of the target website which is requested for service content by the client 511, and returning the IP address to the optimal CDN node server 403.

As shown in FIG. 5, the optimal CDN node server 403 is not coupled to the shared dispatching database 402, and the client 511 is coupled to the shared dispatching database 402.

The optimal CDN node server 403 is further used for notifying the client 511 when the optimal CDN node server 403 determines that the IP address segment thereof, which is suitable for providing service to the client, does not contain the IP address of the client 511.

The shared dispatching database is further used for providing an address of another CDN node server 404 of the target website that is suitable for providing service to the client 511 based on the IP address of the client 511 and the domain name of the target website which is requested for the service content by the client 511, and returning the address to the client 511.

Moreover, the system 40 further includes: a target website server 405 used for storing and providing service content corresponding to the target website.

The optimal CDN node server 403 is further used for requesting to obtain the service content requested by the client 511 from the target website server 405, storing and forwarding the service content of the target website requested by the client 511 to the client 511 when the service content stored in the optimal CDN node server 403 does not contain the service content requested by the client 511.

The other CDN node server 404 is further used for requesting to obtain the service content requested by the client 511 from the target website server 405, storing and forwarding the service content of the target website requested by the client 511 to the client 511 when the service content stored in the other CDN node server 404 does not contain the service content requested by the client 511.

Furthermore, the system further comprises: a target website authorizing DNS server (not shown), which is coupled to the local DNS 512, used for receiving the domain name of the target website which is requested for service content by the client 511 performing resolution, and returning an alias name of the target website that is obtained after the resolution to the client 511, in which the alias name points to the IP address of the DNS server 401 authorized by the CDN of the target website.

The terminal 51 is a user of the system or can be regarded as a portion of the system. The terminal 51 includes: the client 511 and the local DNS 512, wherein:

the local DNS 512 is used for forwarding the domain name of the target website to the DNS server authorized by the target website, receiving the alias name of the target website returned by the DNS server authorized by the target website, in which the alias name is resolved based on the domain name of the target website, and sending the IP address of the local DNS and the domain name of the target website to the DNS server authorized by the CDN of the target website for searching based on the alias name of the target address, receiving the IP address of the optimal node server that is found by the DNS server authorized by the CDN of the target website, and forwarding the IP address of the optimal CDN node server to the client.

In order to redirect to the CDN node server 404, there are two kinds of structure with respect to a relationship among the shared dispatching database 402, the optimal CDN node server 403 and the client 511:

As shown in FIG. 4, the optimal CDN node server 403 is coupled to the shared dispatching database 402, and the client 511 is not coupled to the shared dispatching database 402.

The client 511, which intends to request service content from a target website, sends a domain name of a target website to the local DNS 512, receives IP address(es) of the optimal CDN node server 403 and/or the other CDN node server 404, sends a request for obtaining the service content of the target website to the optimal CDN node server 403 and/or the other CDN node server 404, and reads and displays the service content of the target website as requested by the client end 511 that is sent from the optimal CND node server 403 and/or the other CDN node server 404.

As shown in FIG. 5, the optimal CDN node server 403 is not coupled to the shared dispatching database 402, and the client 511 is coupled to the shared dispatching database 402.

The client 511, which intends to request the service content from the target website, is used for sending the domain name of the target website to the local DNS 512, receiving IP address(es) of an optimal CND node server 403 and/or the other CDN node server 404, sending a request for obtaining the service content of the target website to the optimal CDN node server 403 and/or the other CDN node server 404, reading and displaying the service content of the target website requested by the client 511 that is sent from the optimal CND node server 403 and/or the other CDN node server 404. The client 511 is further used for receiving a notification from the optimal CDN node server 403, searching for the IP address of the other CDN node server 404 of the target website that is suitable for providing service to the client 511 in the shared dispatching database 402 based on the IP address of the client 511 and the domain name of the target website.

In a practical implementation, the client 511 is a browser or an apparatus that provides similar functions, and the terminal 51 is a computer system in which the client 511 is resided.

The dispatching method and system provided by the present disclosure first performs dispatching based on a user request, and determines a dispatching accuracy on a node server. If it is inaccurate, a second dispatching is performed by using a redirection method. On the one hand, this guarantees accurate resource dispatching with a good dispatching time for requests from most local DNS and clients in a same network segment. On the other hand, with respect to a small portion of local DNS and the clients which IP addresses are not on the same network, it will not lose the effect of CDN acceleration caused by an error in DNS dispatching. In addition, the present disclosure expands the scope of load balancing for CDN node servers by applying redirection method to implement link load dispatching across an Internet Data Center (i.e., IDC) of network operators. Furthermore, a concept of a shared dispatching database is introduced, and dispatching information is globally shared among all CDN node servers. Moreover, a determination of whether the CDN node server is suitable to serve a request of the client end is introduced, where the determination is based on the IP address of the client.

The method for precisely dispatching a request by use of a CDN and a system using the same provided by the present disclosure are capable of solving the issue of low processing efficiency in CDN caused by the increase in resolution time needed in the process of dispatching IP address and the issue of IP address error during the dispatching process.

The method for precisely dispatching a request by use of a CDN and a system using the same provided by the present disclosure are further able to process a network that does not support Anycast broadcast so as to achieve IP dispatching without lowering the dispatching efficiency due to the decrease in resolution efficiency.

In a typical configuration, a computing device includes one or more processors (CPU), input/output interfaces, a network interface and memory.

The memory may include a form of computer readable media, e.g., a non-permanent storage device, random-access memory (RAM) and/or a nonvolatile internal storage, such as read-only memory (ROM) or flash RAM. The internal storage is an example of computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Figure 9:
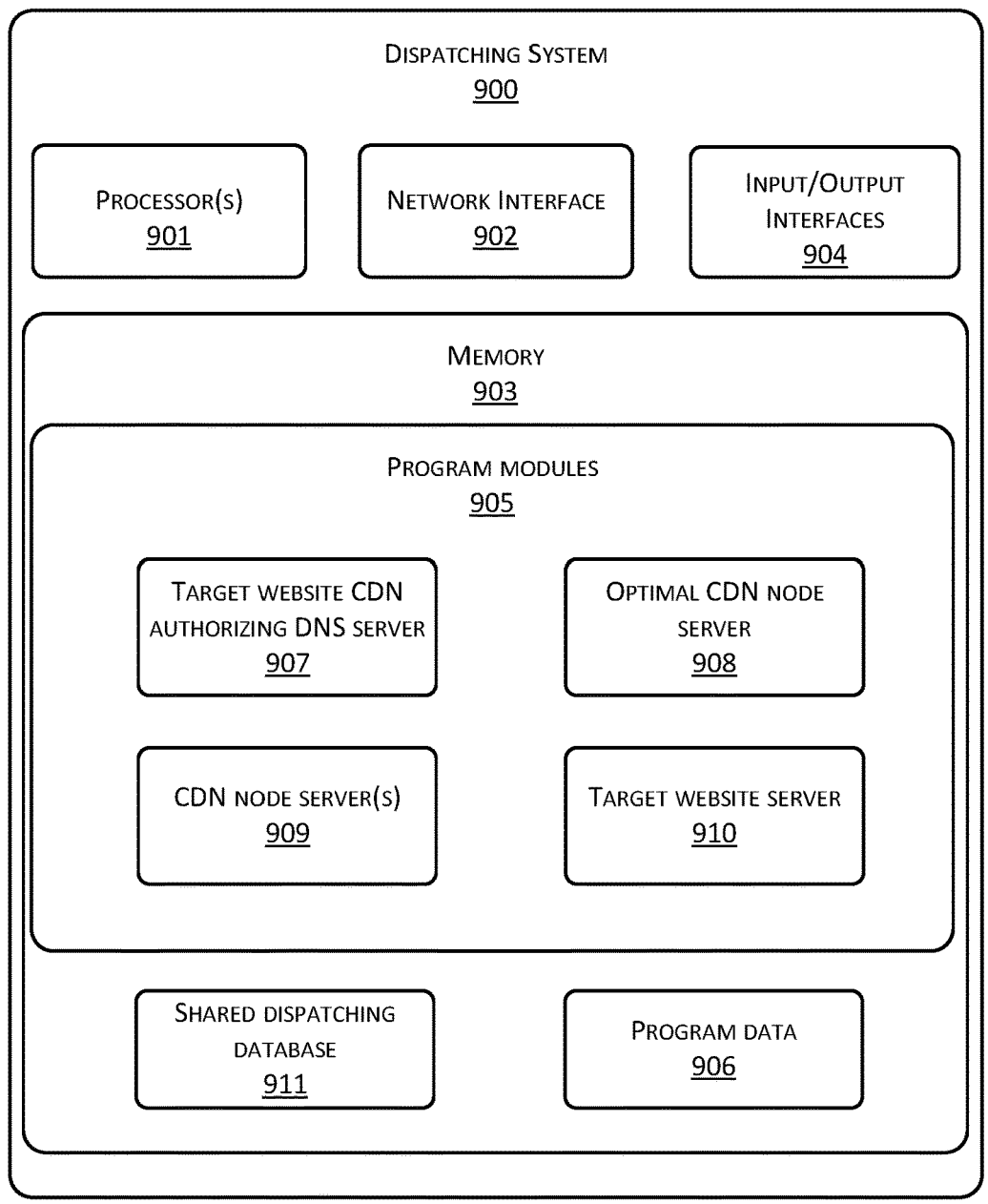
FIG. 9 is a schematic diagram illustrating the system described in FIGS. 4 and 5 in further details.

FIG. 9 shows an example dispatching system 900, such as the system as described above, in more detail. In one embodiment, the system 900 may include, but is not limited to, one or more processors 901, a network interface 902, memory 903 and an input/output interface 904.

The memory 903 may include computer-readable media in the form of volatile memory, such as random-access memory (RAM) and/or non-volatile memory, such as read only memory (ROM) or flash RAM. The memory 903 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 903 may include program modules 905 and program data 906. In one embodiment, the program modules 905 may include a target website CDN authorizing DNS server 907, an optimal CDN node server 908, one or more other CDN node servers 909 and a target website server 910. In some embodiments, the memory 903 may include a shared dispatching database 911. Additionally, in one embodiment, the system 900 may or may not include a terminal that includes a local DNS and a client (not shown). Details about these program modules may be found in the foregoing embodiments described above. The system 900 may be in a form of a single entity (such as a single computing device), or may be distributed among multiple computing devices and/or in a cloud computing architecture. The various components of the systems, e.g., the target website CDN authorizing DNS server 907, the optimal CDN node server 908, the one or more other CDN node servers 909, the target website server 910 and the shared dispatching database 911 may be located in a single computing device or distributed among the multiple computing devices, e.g., in a distributed computing system or cloud computing architecture. Furthermore, although in this example, the target website CDN authorizing DNS server 907, the optimal CDN node server 908, the one or more other CDN node servers 909, the target website server 910 and the shared dispatching database 911 are described to be either program modules or program data stored in the memory 903, in some embodiments, these servers or database may be individual entities or devices, each including a respective set of one or more processors (e.g., hardware processors), memory, a network interface and/or an input/output interface, and communicate with one another and with a terminal including a client and a local DNS (as described in the foregoing embodiments), through a communication or data network. FIG. 9 merely represents an example of the system including these servers and database.

It should be noted that the terms "comprise", "include" or any other variations thereof are meant to cover the non-exclusive inclusions. The process, method, product or apparatus that includes a series of elements not only includes those elements, but also includes other elements that are not explicitly listed, or further includes elements that already existed in such process, method, product or apparatus. In a condition without further limitations, an element defined by the phrase "include one . . . " does not exclude any other similar elements from existing in the process, method, product or apparatus.

A person with ordinary skill in the art should understand that the embodiments of the present disclosure can be provided as a method, a system or a product of a computer program. Therefore, the present disclosure can be implemented as an embodiment of only hardware, an embodiment of only software or an embodiment of a combination of hardware and software. Moreover, the present disclosure can be implemented as a product of a computer program that can be stored in one or more computer readable storage media (which includes but is not limited to, a magnetic disk, a CD-ROM or an optical disk, etc.) that store computer-executable instructions.

The above merely describes the embodiments of the present disclosure, which are not intended to limit the scope of the present disclosure. Various modifications and alternations can be made to the present disclosure by a person with ordinary skill in the art. Any modifications, replacements and improvements within the scope of the spirit and principle of the present disclosure should fall within the scope of the claims of the present disclosure.

What is claimed is:

1. A method comprising:
   receiving an IP address of a local domain name system (DNS) of a terminal and a domain name of a target website of service content requested by a client from the local DNS, wherein the client is located in the terminal;
   finding an address of an optimal content delivery network (CDN) node server of the target website that is suitable for providing service to the client from a shared dispatching database based on an IP address of the local DNS and the domain name of the target website, and returning the found address, wherein the shared dispatching database is distributed in a neighborhood of a DNS server authorized by a CDN of the target website and the optimal CDN node server, and includes IP address segments to which supported clients belong and not IP address segments to which supported local DNSs belong, and data in the shared dispatching database is synchronized with data in one or more other shared dispatching databases individually distributed in the respective neighborhood of corresponding DNS servers authorized by the CDN of the target website and corresponding CDN node servers;

obtaining the service content of the target website requested by the client from the optimal CDN node server, and returning the service content of the target website to the client in response to determining that an IP address segment of the optimal CDN node server suitable for providing services thereof contains an IP address of the client; and notifying the client in response to determining that the IP address segment of the optimal CDN node server suitable for providing the services thereof does not contain the IP address of the client such that the client searches, in the shared dispatching database, for another CDN node server of the target website suitable for providing the service to the client based on the IP address of the client and the domain name of the target website of the service content requested by the client, wherein the service content of the target website requested by the client is obtained and returned to the client from the other CDN node server.

2. The method of claim 1, further comprising:
if the optimal CDN node server determines that the IP address segment suitable for providing the services thereof does not contain the IP address of the client, searching for another CDN node server of the target website that is suitable for providing the service to the client based on the IP address of the client and the domain name of the target website of the service content requested by the client, and returning an IP address of the other CDN node server of the target website to the client, wherein the service content of the target website requested by the client is obtained and returned to the client from the other CDN node server.

3. The method of claim 1, wherein obtaining the service content of the target website requested by the client and returning the service content of the target website to the client further comprises:
if service content stored in the optimal CDN node server does not contain the service content requested by the client, the optimal CDN node server requesting to obtain the service content requested by the client from the target website, storing and forwarding the service content requested by the client to the client.

4. The method of claim 2, wherein: if service content stored in the other CDN node server does not contain the service content requested by the client, the other CDN node server requests to obtain the service content requested by the client from the target website, storing and forwarding the service content requested by the client to the client.

5. The method of claim 1, wherein prior to the DNS server authorized by the CDN of the target website receiving, from the local DNS of the terminal in which the client is located, the IP address of the local DNS and the domain name of the target website of the service content requested by the client, the method further comprises:
receiving and resolving, by the DNS server authorized by the CDN of the target website, the domain name of the target website of the service content that is requested by the client from the local DNS, and returning an alias of the target website that is obtained after the resolving to the client, the alias pointing to an address of the DNS server authorized by the CDN of the target website.

6. The method of claim 1, wherein the client comprises a browser.

7. A system for precisely dispatching a request in a content delivery network (CDN), the system coupled to a client, the system comprising:
one or more processors;
memory;
a target website CDN authorizing domain name server stored in the memory and executable by the one or more processors;
a shared dispatching database stored in the memory and executable by the one or more processors; and
an optimal CDN node server stored in the memory and executable by the one or more processors, wherein:
the target website CDN authorizing domain name server is used for receiving, from a local domain name system (DNS) of a terminal in which a client is located, an IP address of the local DNS and a domain name of a target website of service content requested by the client;
the shared dispatching database is used for providing an address of an optimal CDN node server of the target website that is suitable for providing service to the client based on an IP address of the local DNS and the domain name of the target website, wherein the shared dispatching database is distributed in a neighborhood of a DNS server authorized by a CDN of the target website and the optimal CDN node server, and includes IP address segments to which supported clients belong and not IP address segments to which supported local DNSs belong, and data in the shared dispatching database is synchronized with data in one or more other shared dispatching databases individually distributed in the respective neighborhood of corresponding DNS servers authorized by the CDN of the target website and corresponding CDN node servers; and
the optimal CDN node server is used for:
obtaining the service content of the target website requested by the client from service content stored in the optimal CDN node server and returning the service content of the target website to the client in response to determining that an IP address segment of the optimal CDN node server suitable for providing services thereof contains an IP address of the client; and
notifying the client in response to determining that the IP address segment of the optimal CDN node server suitable for providing the services thereof does not contain the IP address of the client, such that the client searches, in the shared dispatching database, for another CDN node server of the target website suitable for providing the service to the client based on the IP address of the client and the domain name of the target website of the service content requested by the client, wherein the service content of the target website requested by the client is obtained and returned to the client from the other CDN node server.

8. The system of claim 7, further comprising another CDN node server stored in the memory and executable by the one or more processors, wherein:
the optimal CDN node server is further used for, upon determining that the IP address segment suitable for providing the services thereof does not contain the IP address of the client, sending the IP address of the client and the domain name of the target website of the service content requested by the client to the shared dispatching database, and returning an IP address of the other CDN node server of the target website, which is returned from the shared dispatching database, to the client;

the shared dispatching database is further used for providing the address of the other CDN node server of the target website suitable for providing the service to the client based on the IP address of the client and the domain name of the target website of the service content requested by the client from the optimal CDN node server, and returning the IP address of the other CDN node server of the target website to the client; and the other CDN node server is used for, after receiving the request for obtaining the service content of the target website from the client and determining that an IP address segment suitable for providing the services thereof contains the IP address of the client, obtaining the service content of the target website requested by the client from service content stored in the other CDN node server, and returning the service content of the target website to the client.

9. The system of claim 7, further comprising another CDN node server stored in the memory and executable by the one or more processors, wherein:

the shared dispatching database is further used for providing an address of the other CDN node server of the target website that is suitable for providing the service to the client based on the IP address of the client and the domain name of the target website of the service content requested by the client, and returning the address of the other CDN node server to the client; and the other CDN node server is used for obtaining the service content of the target website requested by the client from service content stored in the other CDN node server and returning the service content of the target website to the client after the other CDN node server receives the request for obtaining the service content of the target website from the client and determines that an IP address segment suitable for providing the services thereof contains the IP address of the client.

10. The system of claim 7, further comprising a target website server stored in the memory and executable by the one or more processors, wherein:

the optimal CDN node server is further used for requesting to obtain the service content of the target website requested by the client from the target website server, storing and forwarding the service content of the target website requested by the client to the client when the service content stored in the optimal CDN node server does not contain the service content requested by the client; and the target website server is used for storing and providing the service content corresponding to the target website.

11. The system of claim 8, further comprising a target website server stored in the memory and executable by the one or more processors, wherein:

the other CDN node server is further used for requesting to obtain the service content of the target website requested by the client from the target website server, storing and forwarding the service content of the target website requested by the client to the client when the service content stored in the other CDN node server does not contain the service content requested by the client; and the target website server is used for storing and providing the service content corresponding to the target website.

12. The system of claim 7, further comprising:

a target website authorizing domain name server stored in the memory and executable by the one or more processors and used for receiving the domain name of the target website of the service content requested by the client from the local DNS, performing resolution, and returning an alias of the target website that is obtained after the resolution to the client, the alias pointing to an address of a DNS server authorized by the CDN of the target website.

13. One or more computer-readable media storing executable instructions that, when executed by one or more processors, cause the one or more processors to perform acts comprising:

receiving an IP address of a local domain name system (DNS) of a terminal and a domain name of a target website of service content requested by a client from the local DNS, wherein the client is located in the terminal;

finding an address of an optimal content delivery network (CDN) node server of the target website that is suitable for providing service to the client from a shared dispatching database based on an IP address of the local DNS and the domain name of the target website, and returning the found address, wherein the shared dispatching database is distributed in a neighborhood of a DNS server authorized by a CDN of the target website and the optimal CDN node server, and includes IP address segments to which supported clients belong and not IP address segments to which supported local DNSs belong, and data in the shared dispatching database is synchronized with data in one or more other shared dispatching databases individually distributed in the respective neighborhood of corresponding DNS servers authorized by the CDN of the target website and corresponding CDN node servers;

obtaining the service content of the target website requested by the client from the optimal CDN node server, and returning the service content of the target website to the client in response to determining that an IP address segment of the optimal CDN node server suitable for providing services thereof contains an IP address of the client; and notifying the client in response to determining that the IP address segment of the optimal CDN node server suitable for providing the services thereof does not contain the IP address of the client, such that the client searches, in the shared dispatching database, for another CDN node server of the target website suitable for providing the service to the client based on the IP address of the client and the domain name of the target website of the service content requested by the client, wherein the service content of the target website requested by the client is obtained and returned to the client from the other CDN node server.

14. The one or more computer-readable media of claim 13, the acts further comprising:

if the optimal CDN node server determines that the IP address segment suitable for providing the services thereof does not contain the IP address of the client, searching for another CDN node server of the target website that is suitable for providing the service to the client based on the IP address of the client and the domain name of the target website of the service content requested by the client, and returning an IP address of the other CDN node server of the target website to the client, wherein the service content of the target website requested by the client is obtained and returned to the client from the other CDN server.

15. The one or more computer-readable media of claim 13, wherein obtaining the service content of the target website requested by the client and returning the service content of the target website to the client further comprises:
if service content stored in the optimal CDN node server does not contain the service content requested by the client, the optimal CDN node server requesting to obtain the service content requested by the client from the target website, storing and forwarding the service content requested by the client to the client.

16. The one or more computer-readable media of claim 14, wherein: if service content stored in the other CDN node server does not contain the service content requested by the client, the other CDN node server requests to obtain the service content requested by the client from the target website, storing and forwarding the service content requested by the client to the client.

17. The one or more computer-readable media of claim 13, wherein prior to a DNS server authorized by a CDN of the target website receiving, from the local DNS of the terminal in which the client is located, the IP address of the local DNS and the domain name of the target website of the service content requested by the client, the acts further comprise:
receiving and resolving, by the DNS server authorized by the CDN of the target website, the domain name of the target website of the service content that is requested by the client from the local DNS, and returning an alias of the target website that is obtained after the resolving to the client, the alias pointing to an address of the DNS server authorized by the CDN of the target website.

18. The one or more computer-readable media of claim 13, wherein the client comprises a browser.

* * * * *